(12) United States Patent
Krüger et al.

(10) Patent No.: US 6,989,926 B2
(45) Date of Patent: Jan. 24, 2006

(54) TRANSMITTED-LIGHT ILLUMINATION DEVICE FOR A MICROSCOPE

(75) Inventors: Ralf Krüger, Butzbach/Griedel (DE); Peter Euteneuer, Lahnau (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 42 days.

(21) Appl. No.: 10/721,102

(22) Filed: Nov. 26, 2003

(65) Prior Publication Data

US 2004/0105148 A1    Jun. 3, 2004

(30) Foreign Application Priority Data

Nov. 29, 2002  (DE) ................. 102 56 149

(51) Int. Cl.
  *G02B 21/06*    (2006.01)

(52) U.S. Cl. .................................... 359/388

(58) Field of Classification Search ............... 359/368, 359/381, 385, 388, 389
See application file for complete search history.

(56) References Cited

U.S. PATENT DOCUMENTS

| | | | |
|---|---|---|---|
| 3,679,287 A | 7/1972 | Takahashi et al. | |
| 3,833,282 A | 9/1974 | Kappl et al. | |
| 4,163,150 A | 7/1979 | Stankewitz | |
| 4,253,726 A * | 3/1981 | Taira | 359/388 |
| 4,363,532 A | 12/1982 | Weber | |
| 4,397,529 A * | 8/1983 | Taira | 359/381 |
| 5,684,625 A | 11/1997 | Stankewitz et al. | |
| 5,896,223 A * | 4/1999 | Tigliev et al. | 359/388 |
| 6,212,005 B1 * | 4/2001 | Kawasaki et al. | 359/388 |

FOREIGN PATENT DOCUMENTS

| | | |
|---|---|---|
| AT | 167069 B | 11/1950 |
| EP | 0 841 584 A2 | 5/1998 |
| JP | 9-33820 A | 2/1997 |

* cited by examiner

*Primary Examiner*—Mark A. Robinson
*Assistant Examiner*—Alessandro Amari
(74) *Attorney, Agent, or Firm*—Foley & Lardner LLP

(57) ABSTRACT

The present invention concerns a microscope and an illumination device for a microscope that ensure optimal illumination in the standard (10×–100×), scanning (1.6×–5×), and macro (1×–1.6×) ranges. The illumination system comprises only one condenser head that can be switched in or out and that can optimally illuminate the entire range from 1× to 100×, and a movably arranged focusing lens that ensures optimal adaptation of the illumination to the entrance pupil for all ranges.

29 Claims, 2 Drawing Sheets

TRANSMITTED-LIGHT ILLUMINATION DEVICE FOR A MICROSCOPE

CROSS REFERENCE TO RELATED APPLICATIONS

This application claims priority of the German patent application 102 56 149.4 which is incorporated by reference herein.

FIELD OF THE INVENTION

The present invention concerns a transmitted-light illumination device for a microscope, in which the illuminating light of a light source is incident onto the object plane through a collector lens, a field diaphragm, an aperture diaphragm, and a condenser lens.

BACKGROUND OF THE INVENTION

When fine structures are being examined, it is important to protect the preparation from scattered light, which otherwise decreases contrast and washes out fine detail. In microscopy, scattered light is excluded if only the visible field of view in the preparation is illuminated, and the rest remains dark. This function is performed by the field diaphragm. The aperture diaphragm, on the other hand, substantially determines the imaging properties, which can be modified in favor of contrast or resolution depending on the requirements of the various preparations. Both diaphragms are therefore critically important in terms of the quality of the microscopic image, and must be individually adjusted for the particular magnification and specimen conditions.

On the microscope, the objective nosepiece is usually fitted with a plurality of objectives. The selection extends from a scanning objective to objectives having very high magnification and resolution. To ensure that the field of view can be changed quickly while using the microscope, however, it is also necessary to adapt the illumination in each case. This is achieved by adjusting the field and aperture diaphragms. The requirements of the objectives in terms of illumination—regarding the object field to be illuminated, and the illumination angle—are sufficiently different, however, that adaptation of the geometric flux within the illumination system is necessary, since the size and the emission characteristics of the light sources used are limited. This adaptation of the geometric flux of the illumination is achieved by switching different condensers into the beam path for the individual magnification ranges.

In ordinary microscope transmitted-light illumination systems, the aperture and field diaphragms are located in the stand base. As depicted in FIG. 1 (existing art), this type of illumination ensures that the aperture diaphragm is imaged into the entrance pupil of the condensers (FIG. 1A), and the field diaphragm is imaged into the preparation plane (FIG. 1B). In such a configuration, the illumination source is usually imaged into the aperture diaphragm plane; this is referred to as "Köhler illumination."

In order to illuminate the entire objective magnification range from 1× to 100×, the existing art describes different condenser heads or complex condenser optical systems having double-hinged mechanisms that are swung into the beam path (FIG. 1). It must be ensured in this context that both diaphragm imaging conditions exist as described above.

U.S. Pat. No. 5,684,625 discloses an illumination device having two index positions: the standard range 10×–100×, and the scanning range 1.6×–5×. As the scanning condenser head is swung in, an additional lens is simultaneously swung in by means of a complex mechanical coupling, so that Köhler illumination is maintained for the entire magnification range. An extension into the macro range down to 1× objectives is not technically possible.

JP 9033820A describes an illumination device having three index positions: the standard range 10×–100×, the scanning range 1.6×–5×, and the macro range=1×. With this illumination device, the extension of the magnification range is achieved by way of an additional optical cascade. The complexity and technical risk are thereby increased, however, because of the additional condenser head, the complex pivoting mechanism of the three-head switching system in a very limited space below the specimen stage, and the additional reduction in installation space due to the condenser disk for receiving light rings and DIC prisms for contrasting techniques. The Köhler illumination principle exists for the standard and scanning ranges, and critical illumination for the macro range.

The optical illumination method disclosed in EP 0 841 584 A2 provides two index positions: the standard range 10×–100×, and the scanning range 1×–5×. This expanded objective magnification range is achieved with only one simple switchover below the object stage. The standard range is implemented with a condenser head using the Köhler illumination principle. For the lower magnifications, switching out the condenser head simultaneously switches in an assembly located lower down, so that the overall result is an afocal system which no longer conforms to the Köhler illumination principle. In this configuration, the field diaphragm of the standard range becomes the aperture diaphragm of the scanning and macro range. The aperture diaphragm of the standard range does not, however, take over the function of the field diaphragm for the lower-magnification objectives, or at most can limit the field of view very approximately; this results in inhomogeneously illuminated object fields when the diaphragm is closed. This unsatisfactory type of field limitation represents the greatest disadvantage of this kind of illumination.

The requirements for the condenser system are stringent, since size ranges for objectives from 1× to 100× must be illuminated using the same optical system. These boundary conditions could hitherto be satisfied only by complex and intricate multi-stage condenser systems that have the disadvantages described above.

SUMMARY OF THE INVENTION

It is therefore the object of the present invention to make available a simple illumination device for a microscope that ensures optimum field and pupil illumination in the standard (10×–100×), scanning (1.6×–5×) and macro (1×–1.6×) ranges.

The object is achieved, according to the present invention, by an illumination system in which the illuminating light of a light source is incident onto the object plane through a collector lens, a field diaphragm, an aperture diaphragm, and a condenser lens, the condenser lens being switchable in and out, and a focusing lens displaceable along the optical axis being arranged between the field diaphragm and aperture diaphragm.

The arrangement has the advantage that the entire range from 1× to 100× can be optimally illuminated using only one condenser head that can be switched in or out.

Proceeding from EP 0 841 584 A2, sacrificing continuous Köhler illumination results in additional degrees of freedom for better adaptation of the geometric flux, and therefore in the possibility of achieving all magnifications between 1× and 100× with one index position. The condenser head according to the present invention is switched in only in the standard range. In the scanning and macro range, the condenser region remains optics-free; a collector optical system comprising e.g. a first and a second lens element, together with a focusing lens for transmitted-light illumination, takes over the function of the scanning condenser for objectives in the range from 1× to 5×. In order to eliminate the deficiency of the inadequate field diaphragm in the scanning range, a focusing lens arranged according to the present invention within the illumination axis serves to focus the field diaphragm into the object plane.

This focusing capability is also particularly advantageous when the standard condenser is replaced with oil condensers, condensers with long working distances, or special dark-field condensers. In such cases, imaging of the aperture diaphragm into the entrance pupil of the condenser can be optimally adapted. This ensures that both the field illumination and pupil illumination are optimal for almost any desired condenser.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
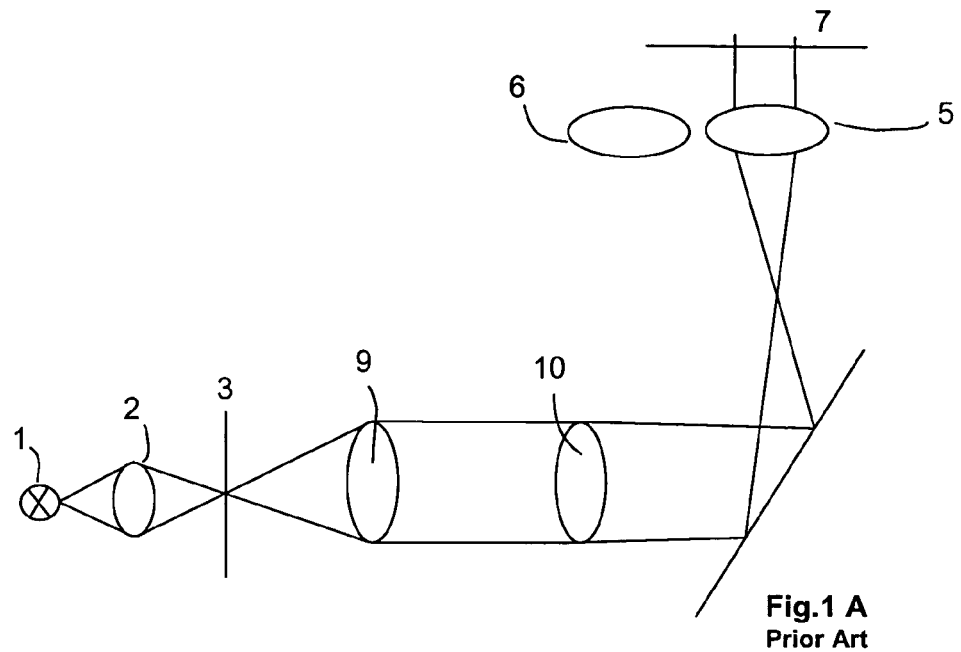
FIG. 1A depicts in principle the illumination beam path of a microscope illumination system known from the existing art, with aperture diaphragm imaging in the standard range.
FIG. 1B depicts in principle the illumination beam path of a microscope illumination system known from the existing art, with field diaphragm imaging in the standard range.
Figure 1:
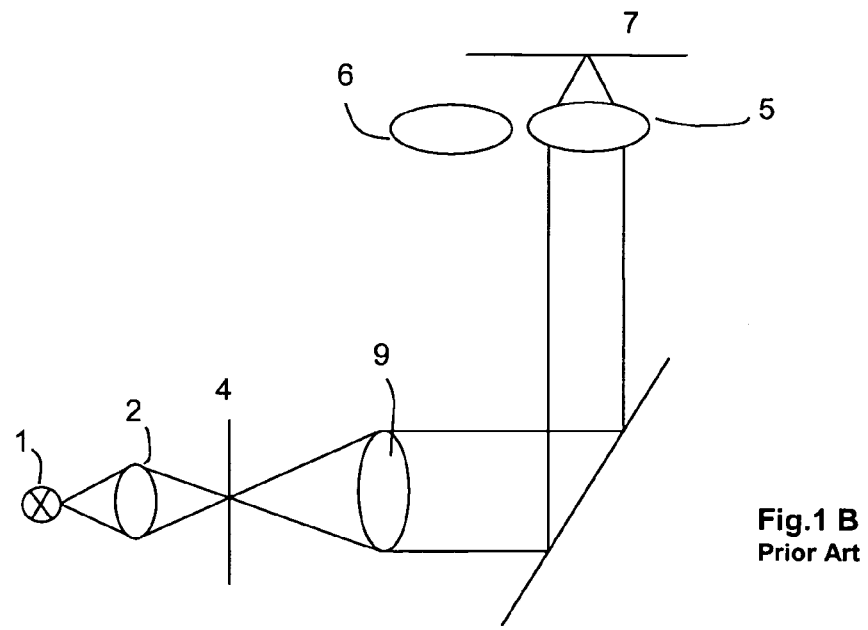

FIG. 1A schematically depicts the illumination beam path in the standard magnification range of a known microscope illumination system, in which the illuminating light of a light source 1 is imaged by a collector lens 2 and an aperture diaphragm 3 into the entrance pupil of a first condenser 5.

FIG. 1B schematically shows the illumination beam path in the standard magnification range of a microscope illumination system known from the existing art, in which the illuminating light of a light source 1 is imaged by a collector lens 2 and a field diaphragm 4, via a first condenser 5, into specimen 7. For a condenser optical system adjusted for the macro or standard range, first condenser 5 must be laboriously replaced with a second condenser 6, with the disadvantages described above.

Figure 2:
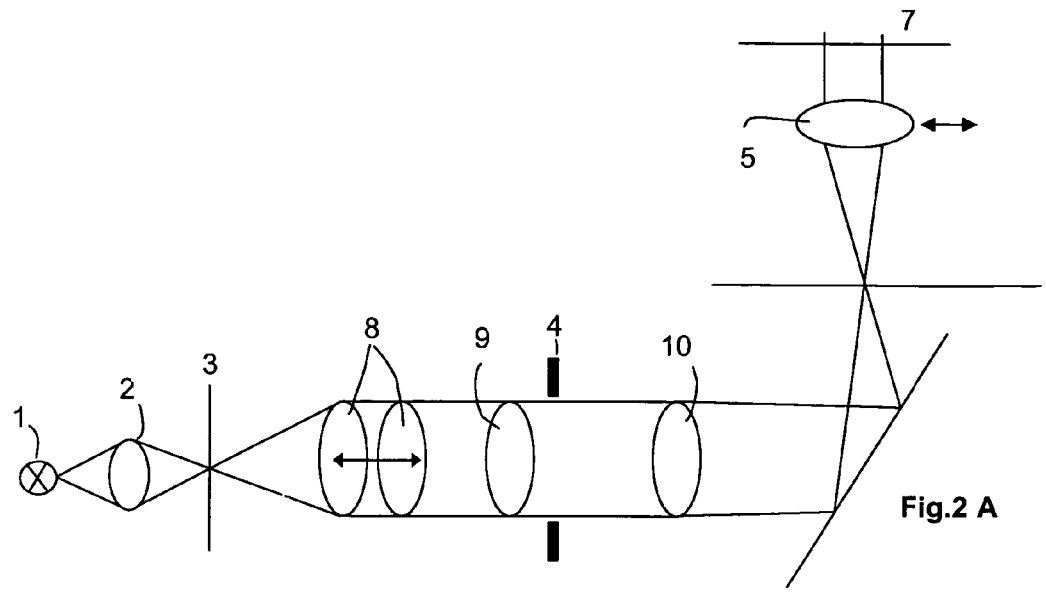
FIG. 2A depicts in principle the illumination beam path of the transmitted-light microscope illumination system according to the present invention, with aperture diaphragm imaging in the standard range.
FIG. 2B depicts in principle the illumination beam path of the transmitted-light microscope illumination system according to the present invention, with field diaphragm imaging in the scanning and macro range.
Figure 2:
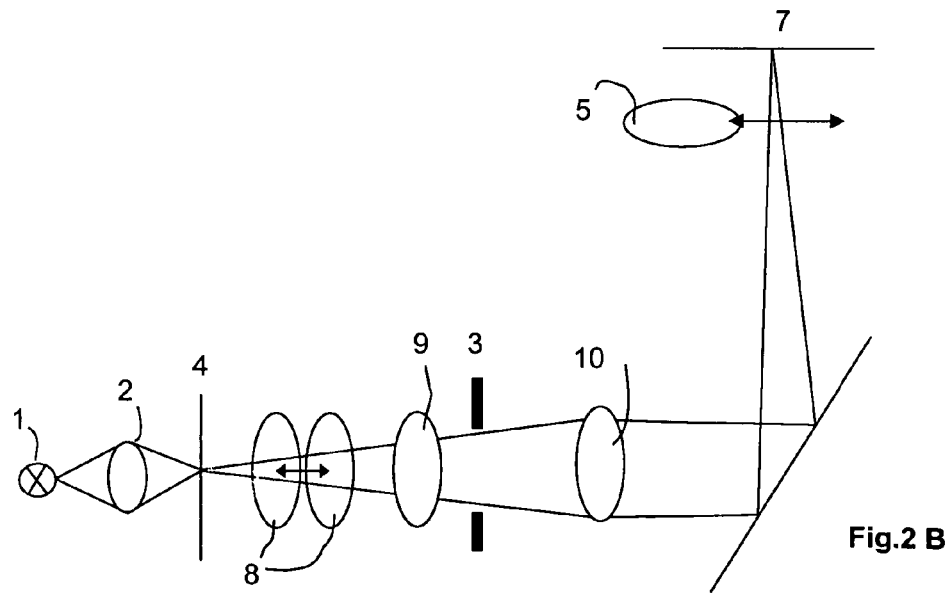

The transmitted-light microscope illumination system according to the present invention is depicted schematically in FIG. 2. FIG. 2A shows the illumination beam path that is preferably used for standard magnifications (10×–100×), in which context the optical system from the light source to the surface of preparation 7 conforms to the Köhler illumination principle. Here the illuminating light of a light source 1 is imaged by a collector lens 2 and an aperture diaphragm 3 into the entrance pupil of a movable condenser 5. The motion of condenser 5 is illustrated by an arrow.

FIG. 2B schematically shows the illumination beam path that is preferably used for low magnification conditions (1×–5×), in which context the optical system from light source 1 to the surface of preparation 7 conforms to the critical illumination principle, i.e. the light source is imaged into specimen 7. As compared with the configuration in FIG. 2A, condenser 5 is swung out (the motion being illustrated by an arrow) and a focusing lens 8 is displaced (the motion being illustrated by an arrow), so that field diaphragm 4 is now imaged into specimen 7. Condenser 5 is mechanically or electrically swung downward or to the side out of the beam path. The functions of the diaphragms are moreover interchanged as compared with FIG. 2A: field diaphragm 4 becomes aperture diaphragm 3, and vice versa.

Swinging out condenser 5 creates an optics-free arrangement. In this arrangement, the laborious changing of condenser optical systems (especially in automated microscopes) is unnecessary, but it is nevertheless possible to use a particularly wide magnification range, extending from very high magnifications (e.g. 10×14 100×) to low magnifications (e.g. 1×–5×).

The deficiency of the inadequate field diaphragm in the scanning range is remedied by way of a focusing lens 8 according to the present invention which serves, within the illumination axis, to focus field diaphragm 4 into specimen plane 7. The focusing lens is arranged movably along the optical axis, and control is accomplished mechanically or electrically via a spindle motor.

The condenser lens 5 may refer to a condenser lens system that comprises exactly one lens, or a system that comprises a plurality of lenses.

PARTS LIST

1 Light source
2 Collector
3 Aperture diaphragm
4 Field diaphragm
5 First condenser
6 Second condenser
7 Preparation/specimen
8 Focusing lens
9 First lens element
10 Second lens element

What is claimed is:

1. A transmitted-light illumination device for a microscope, comprising:
   a light source configured to generate an illuminating light beam incident onto an object plane of an object to be imaged with the microscope, said illuminating light beam defining an optical axis;
   a collector lens;
   a field diaphragm;
   an aperture diaphragm;
   exactly one condenser lens system and only one condenser lens system, said condenser lens system configured to be switchable into and out of the illuminating light beam, wherein when the condenser lens system is switched out of the illuminating light beam no condenser lens system is present in the illuminating light beam; and
   a focusing lens positioned between said field diaphragm and said aperture diaphragm, said focusing lens configured to be displaceable along the optical axis.

2. A transmitted-light illumination device for a microscope as defined in claim 1, further comprising an electrical control apparatus configured to switch the condenser lens system into and out of the illuminating light beam.

3. A transmitted-light illumination device for a microscope as defined in claim 2, further comprising a spindle motor configured to controllably displace said focusing lens along the optical axis.

4. A transmitted-light illumination device for a microscope as defined in claim 3, wherein the illumination device is configured so that: a) an illumination of said object plane corresponding to an objective magnification range of approximately 10× to 100× is provided when said condenser lens system is switched into the illuminating light beam; and b) an illumination of said object plane corresponding to an objective magnification range of approximately 1× to 5× is provided when said condenser lens system is switched out of the illuminating light beam.

5. A transmitted-light illumination device for a microscope as defined in claim 4, wherein said aperture diaphragm and said field diaphragm exchange their optical functions when said condenser lens system is switched out of the illuminating light beam.

6. A transmitted-light illumination device for a microscope as defined in claim 5, wherein, when said condenser lens system is switched out of the illuminating light beam, said focusing lens is displaced such that said field diaphragm is focused into the object plane.

7. A transmitted-light illumination device for a microscope as defined in claim 2, wherein the illumination device is configured so that: a) an illumination of said object plane corresponding to an objective magnification range of approximately 10× to 100× is provided when said condenser lens system is switched into the illuminating light beam; and b) an illumination of said object plane corresponding to an objective magnification range of approximately 1× to 5× is provided when said condenser lens system is switched out of the illuminating light beam.

8. A transmitted-light illumination device for a microscope as defined in claim 7, wherein said aperture diaphragm and said field diaphragm exchange their optical functions when said condenser lens system is switched out of the illuminating light beam.

9. A transmitted-light illumination device for a microscope as defined in claim 8, wherein, when said condenser lens system is switched out of the illuminating light beam, said focusing lens is displaced such that said field diaphragm is focused into the object plane.

10. A transmitted-light illumination device for a microscope as defined in claim 1, further comprising a spindle motor configured to controllably displace said focusing lens along the optical axis.

11. A transmitted-light illumination device for a microscope as defined in claim 10, wherein the illumination device is configured so that: a) an illumination of said object plane corresponding to an objective magnification range of approximately 10× to 100× is provided when said condenser lens system is switched into the illuminating light beam; and b) an illumination of said object plane corresponding to an objective magnification range of approximately 1× to 5× is provided when said condenser lens system is switched out of the illuminating light beam.

12. A transmitted-light illumination device for a microscope as defined in claim 11, wherein said aperture diaphragm and said field diaphragm exchange their optical functions when said condenser lens system is switched out of the illuminating light beam.

13. A transmitted-light illumination device for a microscope as defined in claim 12, wherein, when said condenser lens system is switched out of the illuminating light beam, said focusing lens is displaced such that said field diaphragm is focused into the object plane.

14. A transmitted-light illumination device for a microscope as defined in claim 1, wherein said condenser lens system is configured to be mechanically switchable into and out of the illuminating light beam.

15. A transmitted-light illumination device for a microscope as defined in claim 1, wherein the illumination device is configured so that: a) an illumination of said object plane corresponding to an objective magnification range of approximately 10× to 100× is provided when said condenser lens system is switched into the illuminating light beam; and b) an illumination of said object plane corresponding to an objective magnification range of approximately 1× to 5× is provided when said condenser lens system is switched out of the illuminating light beam.

16. A transmitted-light illumination device for a microscope as defined in claim 15, wherein said aperture diaphragm and said field diaphragm exchange their optical functions when said condenser lens system is switched out of the illuminating light beam.

17. A transmitted-light illumination device for a microscope as defined in claim 16, wherein, when said condenser lens system is switched out of the illuminating light beam, said focusing lens is displaced such that said field diaphragm is focused into the object plane.

18. A transmitted-light illumination device for a microscope as defined in claim 1, wherein said condenser lens system comprises exactly one lens and only one lens.

19. A transmitted-light illumination device for a microscope as defined in claim 1, wherein said condenser lens system comprises a plurality of lenses.

20. A transmitted-light illumination device for a microscope as defined in claim 1, wherein the focusing lens is adapted to be always positioned in the illuminating light beam.

21. A microscope having a transmitted-light illumination device, comprising:
  a light source configured to generate an illuminating light beam incident onto an object plane of an object to be imaged with the microscope, said illuminating light beam defining an optical axis;
  a collector lens;
  a field diaphragm;
  an aperture diaphragm;
  exactly one condenser lens system and only one condenser lens system, said condenser lens system configured to be switchable into and out of the illuminating light beam, wherein when the condenser lens system is switched out of the illuminating light beam no condenser lens system is present in the illuminating light beam; and
  a focusing lens positioned between said field diaphragm and said aperture diaphragm, said focusing lens configured to be displaceable along the optical axis.

22. A microscope as defined in claim 21, wherein said condenser lens system comprises exactly one lens and only one lens.

23. A microscope as defined in claim 21, wherein said condenser lens system comprises a plurality of lenses.

24. A microscope as defined in claim 21, wherein the focusing lens is adapted to be always positioned in the illuminating light beam.

25. A microscope having a transmitted-light illumination device, comprising:
- a light source configured to generate an illuminating light beam incident onto an object plane of an object to be imaged with the microscope, said illuminating light beam defining an optical axis;
- a collector lens;
- a field diaphragm;
- an aperture diaphragm;
- a condenser lens system, said condenser lens system configured to be switchable into and out of the illuminating light beam, wherein when the condenser lens system is switched out of the illuminating light beam no condenser lens system is present in the illuminating light beam; and
- a focusing lens positioned between said field diaphragm and said aperture diaphragm, said focusing lens configured to be displaceable along the optical axis,
- wherein the illumination device is configured so that: a) an illumination of said object plane corresponding to an objective magnification range of approximately 10× to 100× is provided when said condenser lens system is switched into the illuminating light beam; and b) an illumination of said object plane corresponding to an objective magnification range of approximately 1× to 5× is provided when said condenser lens system is switched out of the illuminating light beam.

26. A microscope as defined in claim 25, wherein the focusing lens is adapted to be always positioned in the illuminating light beam.

27. A microscope having a transmitted-light illumination device, comprising:
- a light source configured to generate an illuminating light beam incident onto an object plane of an object to be imaged with the microscope, said illuminating light beam defining an optical axis;
- a collector lens;
- a field diaphragm;
- an aperture diaphragm;
- a condenser lens system, said condenser lens system configured to be switchable into and out of the illuminating light beam, wherein when the condenser lens system is switched out of the illuminating light beam no condenser lens system is present in the illuminating light beam; and
- a focusing lens positioned between said field diaphragm and said aperture diaphragm, said focusing lens configured to be displaceable along the optical axis,
- wherein the illumination device is configured so that: a) an illumination of said object plane corresponding to an objective magnification range of approximately 10× to 100× is provided when said condenser lens system is switched into the illuminating light beam; and b) an illumination of said object plane corresponding to an objective magnification range of approximately 1× to 5× is provided when said condenser lens system is switched out of the illuminating light beam, and
- wherein said aperture diaphragm and said field diaphragm exchange their optical functions when said condenser lens system is switched out of the illuminating light beam.

28. A microscope as defined in claim 27, wherein, when said condenser lens system is switched out of the illuminating light beam, said focusing lens is displaced such that said field diaphragm is focused into the object plane.

29. A microscope as defined in claim 27, wherein the focusing lens is adapted to be always positioned in the illuminating light beam.

* * * * *